(12) United States Patent
Tripathi et al.

(10) Patent No.: US 11,334,638 B2
(45) Date of Patent: May 17, 2022

(54) METHODS AND SYSTEMS FOR UPDATING A SEARCH INDEX

(71) Applicant: ORACLE INTERNATIONAL CORPORATION, Redwood Shores, CA (US)

(72) Inventors: Aditya Mani Tripathi, Bangalore (IN); Hasari Tosun, Bozeman, MT (US); Anthony Arnone, Bozeman, MT (US); Shane Strasser, Bozeman, MT (US); Karthikeyan Nagarajan, Hyderbad (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 249 days.

(21) Appl. No.: 16/406,054

(22) Filed: May 8, 2019

(65) Prior Publication Data

US 2019/0266208 A1 Aug. 29, 2019

Related U.S. Application Data

(63) Continuation of application No. 14/844,293, filed on Sep. 3, 2015, now Pat. No. 10,296,650.

(51) Int. Cl.
*G06F 16/9537* (2019.01)
*G06F 16/22* (2019.01)
*G06F 16/28* (2019.01)

(52) U.S. Cl.
CPC ......... *G06F 16/9537* (2019.01); *G06F 16/22* (2019.01); *G06F 16/282* (2019.01)

(58) Field of Classification Search
CPC ......... G06F 17/30312; G06F 17/30589; G06F 17/3087; G06F 16/22; G06F 16/282; G06F 16/9537
See application file for complete search history.

(56) References Cited

U.S. PATENT DOCUMENTS

| | | | | |
|---|---|---|---|---|
| 2003/0101183 | A1* | 5/2003 | Kabra | G06F 16/2308 |
| 2005/0283567 | A1* | 12/2005 | Popescu-Stanesti | G06F 12/08 |
| | | | | 711/106 |
| 2008/0319988 | A1* | 12/2008 | Bhattacharjee | G06F 16/319 |
| 2011/0213775 | A1* | 9/2011 | Franke | G06F 16/278 |
| | | | | 707/737 |
| 2013/0041707 | A1* | 2/2013 | Bose | G06Q 40/06 |
| | | | | 705/7.15 |
| 2016/0335334 | A1* | 11/2016 | Teodorescu | H04L 67/42 |

* cited by examiner

*Primary Examiner* — Taelor Kim
(74) *Attorney, Agent, or Firm* — Kraguljac Law Group, LLC

(57) ABSTRACT

A system and method of indexing documents to support frequent field updates without reindexing may include receiving, from an indexing application, first fields from a document to be indexed. The method may also include receiving, from the indexing application, second fields from the document to be indexed. The first fields are to an index file associated with the indexing application. The index file comprises a directory wrapper around at least a portion of a file system for the indexing application, wherein the wrapper (i) provides indications of when the in-memory file is flushed to the file system, and (ii) controls synchronization of the file system and a data store. The method may further include writing the second fields to a reverse index.

18 Claims, 12 Drawing Sheets

METHODS AND SYSTEMS FOR UPDATING A SEARCH INDEX

CROSS REFERENCE TO RELATED APPLICATIONS

This disclosure is a continuation of U.S. patent application Ser. No. 14/844,293 filed Sep. 3, 2015, now U.S. Pat. No. 10,296,650 titled "Methods and Systems for Updating a Search Index", inventors: Aditya Mani Tripathi, Hasari Tousun, Anthony Arnone, Shane Strasser and Karthikeyan Nagarajan, and assigned to the present assignee, which is incorporated herein in its entirety by reference.

BACKGROUND

In order to facilitate fast and accurate information retrieval, search engine indexing collects, parses, and stores data. Popular search engines engage in the full-text indexing of webpages on the Internet and natural-language documents. Generally, a corpus of text can be tokenized into words or concepts that are then stored in a reverse index and a forward index. When receiving a search query, a search engine can generate an intent, or meaning, embodied by the query and search the index for tokens that are responsive to the search query. Once such tokens are found, the search index can be used to retrieve the documents referenced by the index that include these terms.

BRIEF SUMMARY

In some embodiments, a method of indexing documents to support frequent field updates without reindexing may be presented. The method may include receiving, from an indexing application, first fields from a document to be indexed. The method may further include receiving, from the indexing application, second fields from the document to be indexed. The method may additionally include writing the first fields to an index file associated with the indexing application, wherein the index file comprises a directory wrapper around at least a portion of a file system for the indexing application, wherein the wrapper (i) provides indications of when the in-memory file is flushed to the file system, and (ii) controls synchronization of the file system and a data store that is external to the indexing application when the in-memory file is written to the data store; receiving, from the directory wrapper, an indication that a plurality of index segments are being merged; renumbering document identifiers in the data store to parallel document identifier renumbering in the plurality of index segments; and writing the second fields to a reverse index represented in a data store that is external to the indexing application.

In some embodiments, a non-transitory computer-readable medium may be presented. The computer-readable memory may comprise a sequence of instructions which, when executed by one or more processors, causes the one or more processors to perform operations including receiving, from an indexing application, first fields from a document to be indexed. The operations may also include receiving, from the indexing application, second fields from the document to be indexed. The operations may additionally include writing the first fields to an index file associated with the indexing application, wherein the index file comprises a directory wrapper around at least a portion of a file system for the indexing application, wherein the wrapper (i) provides indications of when the in-memory file is flushed to the file system, and (ii) controls synchronization of the file system and a data store that is external to the indexing application when the in-memory file is written to the data store; receiving, from the directory wrapper, an indication that a plurality of index segments are being merged; renumbering document identifiers in the data store to parallel document identifier renumbering in the plurality of index segments; and writing the second fields to a reverse index represented in a data store that is external to the indexing application.

In some embodiments, a system may be presented. The system may include one or more processors and one or more memories communicatively coupled with and readable by the one or more processors. The one or more memories may comprise a sequence of instructions which, when executed by the one or more processors, cause the one or more processors to perform operations including receiving, from an indexing application, first fields from a document to be indexed. The operations may also include receiving, from the indexing application, second fields from the document to be indexed. The operations may additionally include writing the first fields to an index file associated with the indexing application. The operations may further include writing the second fields to a datastore that is external to the indexing application.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

Figure 1:
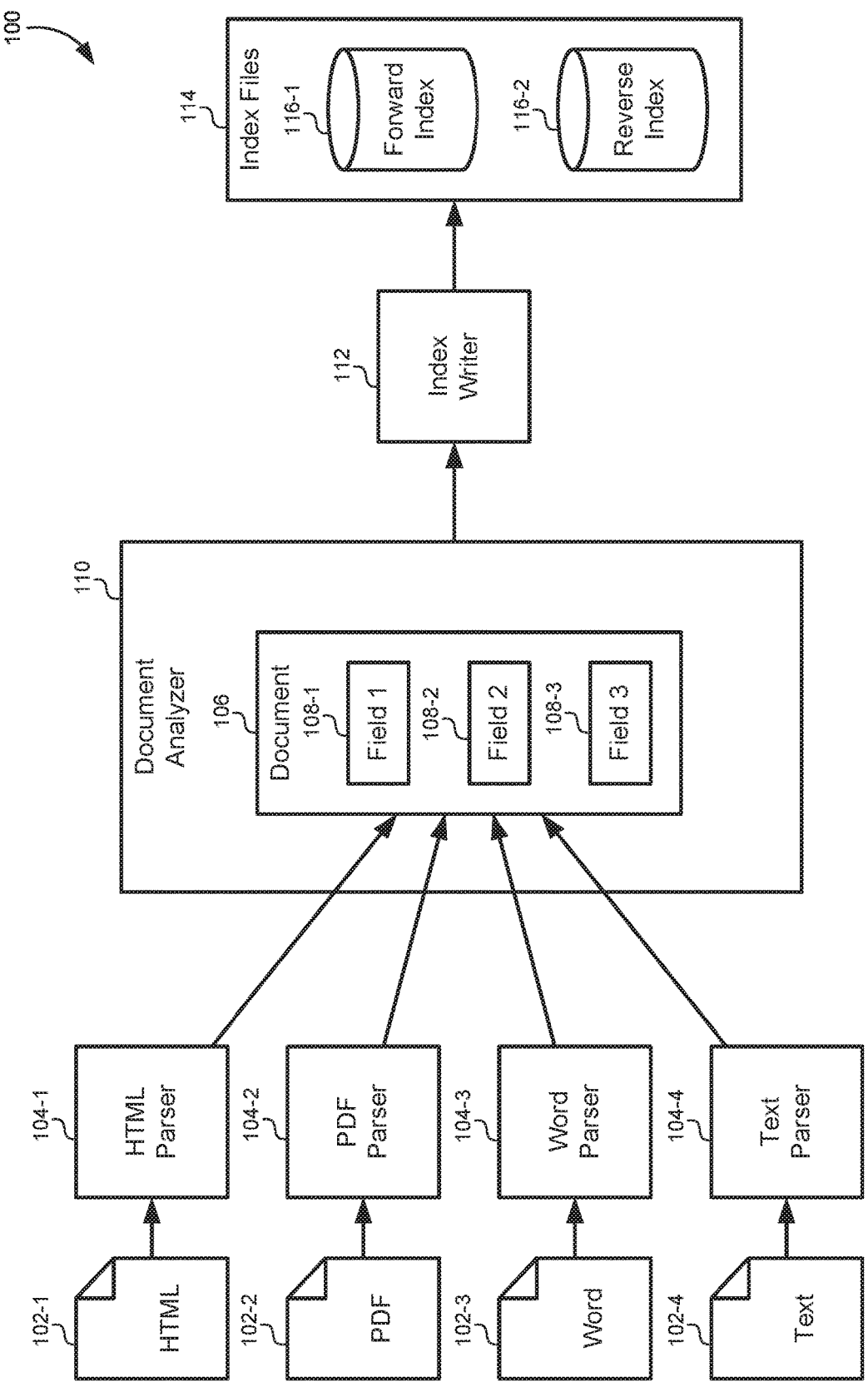
FIG. 1 illustrates an architecture for an indexing application, according to some embodiments.

Described herein, are embodiments for updating documents in an immutable search index without reindexing entire documents. When indexing a document for the first time, the indexing application can tokenize the document and generate fields with values to be stored in the index. Fields in the document that are likely to be updated frequently can be assigned a specific field type indicating such, whereas fields that are not likely to be updated frequently can be assigned pre-existing field types used by the indexing application. Some indexing applications allow users to write custom codecs for encoding fields into a file representation of an index. In some embodiments, a codec architecture is proposed that recognizes the difference between frequently updated fields and relatively static fields based on the field type. For less-frequently updated fields, the codec can write the field to the index data structure provided by the indexing application. However, for frequently updated fields, the codec can write the fields to a separate index stored in an external database.

When a search engine queries the indexing application for certain tokens that are likely to indicate documents that are responsive to a search query, the indexing application can make a request through the codec to both the internal index representation and the external database index. Because the codec handles the interface between the two different data structures, storing the frequently updated fields in the external database is completely transparent to the indexing application and the search layer. Results from both the internal index and the external database can be collected by the codec and returned to the indexing application, which can later be passed to the search layer.

When updating fields that are frequently updated, the indexing application can be completely bypassed. Instead, changes can be made directly to the external database updating only the updated fields. Normally, a change to a single field in a document would cause the document to be resubmitted to the indexing application, which would then re-index the entire document, including every field in the document. New index entries would be generated for each field in the document and added to the index segments in the memory system of the indexing application. Index entries related to the old version of the document would be marked for deletion, but would often persist in the index segments until they were merged. When small changes were made to a large number of documents, each of the documents had to be re-indexed, re-added to the index files, and have the old versions of the documents marked for deletion. This was inefficient both in terms of memory usage and processing power. The embodiments described herein significantly improve the functioning of an indexing computer system by processing changes only to certain fields within a large number of documents. These embodiments also reduce the memory usage of the indexing computer system by eliminating the need to generate new index files and garbage collect the old index files a later time. Between the addition of the new index files and deletion of the old index files, the memory usage was essentially doubled unnecessarily. By making small changes to external databases, memory can be reused without storing unnecessary entries for fields that do not change between document updates.

Many search applications use an immutable index design that allows for faster searching and indexing. An immutable index allows efficient data structures to store dictionary terms while also providing very dense data structures to reduce disk read/write operations when index segments are flushed. Because the index segments are immutable (i.e. not updatable) these immutable indexes operate as append-only storage systems where, when a document is updated, the entire document is reindexed, captured in a new index segment, and later merged with the existing index files. The old document object is marked as deleted and eventually removed from the system. As used herein, the term "immutable index" refers to an indexing application that does not have the ability to update changed fields in an existing document in the index, but rather has to re-index the entire document and mark the old document for deletion.

It will be understood that many different indexing and search applications may be used to index documents. The embodiments described herein can be used with any indexing application, both mutable and immutable. However, for exemplary purposes only, this disclosure will use the commercially available Apache Lucene™ Core, which is a high-performance, full-featured text search engine library written entirely in Java and available as an open source project. Some examples described below will be specific to Lucene™, but one having skill in the art could readily implement these examples in other search and indexing applications.

FIG. 1 illustrates an architecture 100 for an indexing application, according to some embodiments. An indexing application, such as Lucene™, will include a document parser 104 that will include different scripts for each type of document 102 to be indexed by the indexing application. For example, an HTML parser script 104-1 will accept HTML documents 102-1, while a PDF parser script 104-2 will accept PDF documents 102-2. Document parsing breaks apart the components (e.g. words) of a document or other form of media to be inserted into the index files. Words are sometimes referred to as tokens, and tokens can be used to build lemmas representing concepts. The parsing process may also be referred to as tokenization or segmentation. The document parser 104 can use natural word boundaries, whitespace, file formats, metadata, templates, and other methods to isolate and identify individual words in the documents 102. In some indexing applications, tokens identified in the documents 102 can be combined to form multi-word lemmas, such as "email inbox" that represent concepts. Representing concepts instead of just individual words can enhance the quality of a search engine by identifying documents that discuss similar concepts to those embodied by a search query.

The document parser 104 will generate a tokenized document 106 where tokens that should be indexed are organized into fields and values. Each field 108 will have a field type that can be used by an index writer 112 to define an indexing format used by the indexing application. In other words, each field type can have its own function within the index writer 112 that includes specific instructions for writing data from that particular field. Typically, each document can have its own field types in different formats, such as an IdField, a TextField, and so forth. These different field types are defined at the index schema level provided by the search layer. For example, a Solr™ search application can be used in conjunction with the Lucene™ indexing application, and the index schema provided by Solr™ can include field definitions to be used by the Lucene™ indexing application when indexing documents.

The document analyzer 110 can generate index entries for each of the tokens in the tokenized document 106. The document analyzer can take the tokenized document 106 and generate fields that have key-value pairs. For example, a field 108 may consist of a particular token (key) from the tokenized document 106 along with a list of document IDs in which the token appears (value). The index writer 112 can then write each field to an index file 114 based on the field type. The index files 114 may include both a forward index 116-1 and reverse index 116-2. Prior to this disclosure, when a document was updated, the document had to be parsed, tokenized, analyzed, and new fields had to be written to the index file 114. This would occur even if only a single token in the document was changed. If only one or two tokens were changed in a large batch of documents, each document in the batch would need to run through the pipeline of architecture 100 in its entirety, even though only a very small percentage of the overall data represented by the batch of documents had changed.

Figure 2:
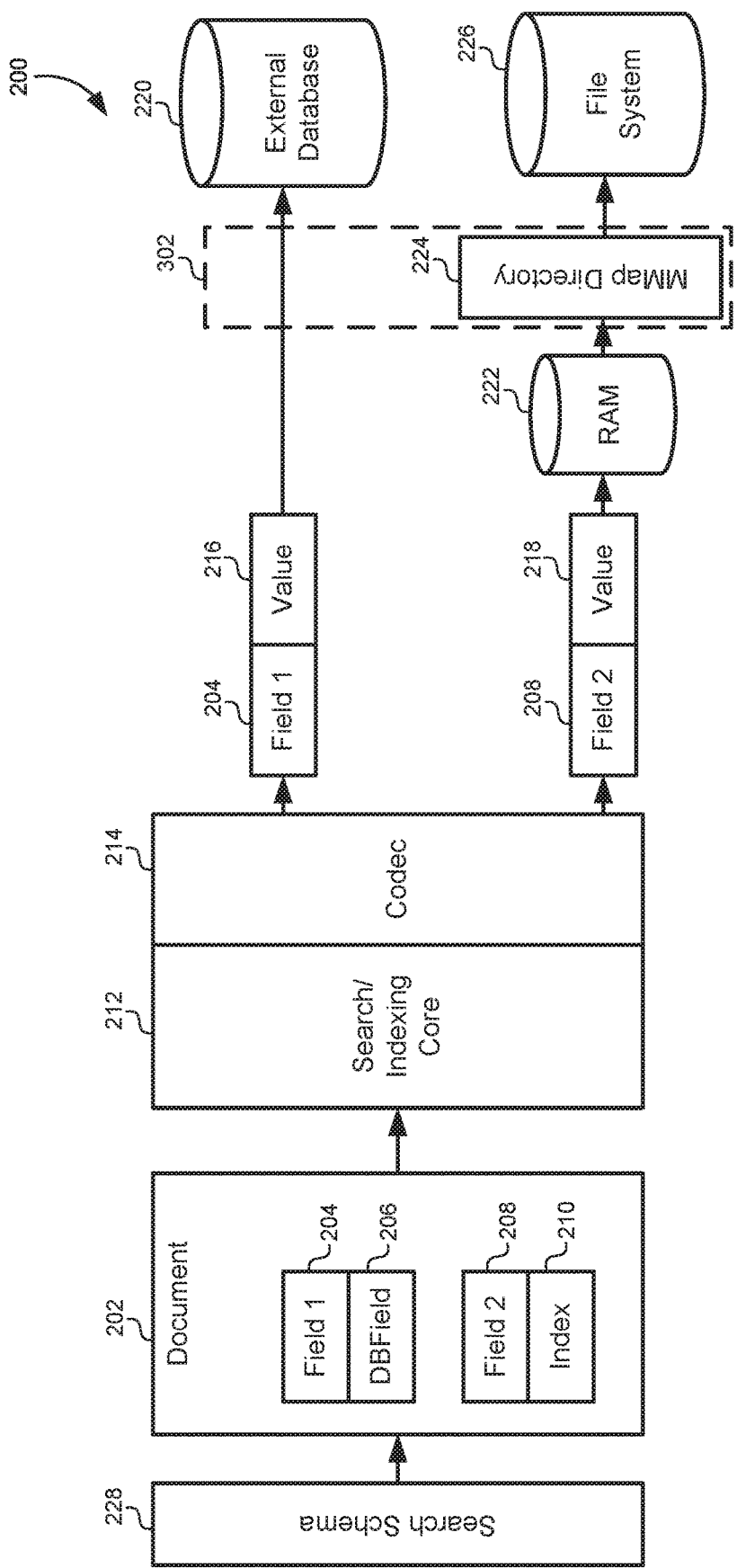
FIG. 2 illustrates an architecture for an indexing application using a custom codec and external database for frequently updated fields, according to some embodiments.

FIG. 2 illustrates an architecture 200 for an indexing application using a custom codec 214 and an external database 220 for frequently updated fields, according to some embodiments. Architecture 200 illustrates how the field definitions provided by a search schema 228 can be used advantageously to identify fields that will be frequently updated. The search schema 222 can provide one or more field types that specifically indicate fields that will be frequently updated. For example, field types indicating an author of a document or a title of the document are not likely to be changed during the lifetime of the document. However, field types indicating a "last modified date" for a document may frequently be updated. In the case of an FAQ or online discussion thread, the content of the body of the document may be frequently updated. In designing the search schema 228, fields that are likely to be frequently updated can be assigned a particular field type. By way of example, the field type "DBField" may be used below to indicate frequently updated fields that will be assigned to an external database.

The tokenized document 202 will include fields 208 with field types that indicate they should be stored directly in the index file of the indexing application. FIG. 2 encapsulates all of the field types that may be stored in the index file with the "Index" 210 label. The tokenized document 202 may also include one or more fields 204 that should be stored in the external database 220, labeled in FIG. 2 with the "DBField" 206 label. The search/indexing core 212 of the indexing application can ignore the difference between DBFields 206 and Index fields 210 to generate forward/reverse index entries, while the custom codec 214 is field types to determine how and where they are stored.

In the embodiment of FIG. 2, a custom codec 214 has been added to the search/indexing core 212. In general, a codec is a software module for encoding or decoding a digital data stream or signal. In these embodiments, the codec specifically consumes fields provided by the search/ indexing core 212 and writes those fields to a memory location in a format dictated by the particular field type during an indexing operation. During a search operation, the custom codec 214 operates in the opposite fashion. The custom codec 214 reads information from a memory location and then generates fields for the search/indexing core 212 as dictated by the particular field type during a search operation. As used herein, these two operations will be referred to as "FieldConsumers" (indexing) and "FieldPro-ducers" (searching). The custom codec 214 encapsulates various types of formats required to manage the entire index, such as actually encoding different data structures for the index representation. The custom codec 214 also manages document deletion and segment merging. For each field, the custom codec 214 extracts the field type and selects a custom FieldConsumer/FieldProducer to write/read the field to memory.

For a field 204 having a DBField type, the field 204 and its corresponding value 216 can be formatted and written to an external database 220, such as a Berkeley Database™. For a field 208 having a field type other than the DBField type, the field 208 and its corresponding value 218 can be written to the index file of the indexing application. In some embodiments, such as those using a Lucene indexing application, the index file will be represented both in RAM 222 and in a more permanent file system 226. For example, every time a document is indexed, a new index segment will be generated and written to RAM 222. The RAM 222 will be memory mapped 224 to the file system 226. When the index representation in RAM 222 reaches a certain size, the index representation in RAM 222 will be flushed to the file system 226. Once flushed, the index representation in memory 222 may merge segments, delete segments, or otherwise perform operations that make the index representation in the file system 226 more efficient and eliminate duplicate entries.

Figure 3:
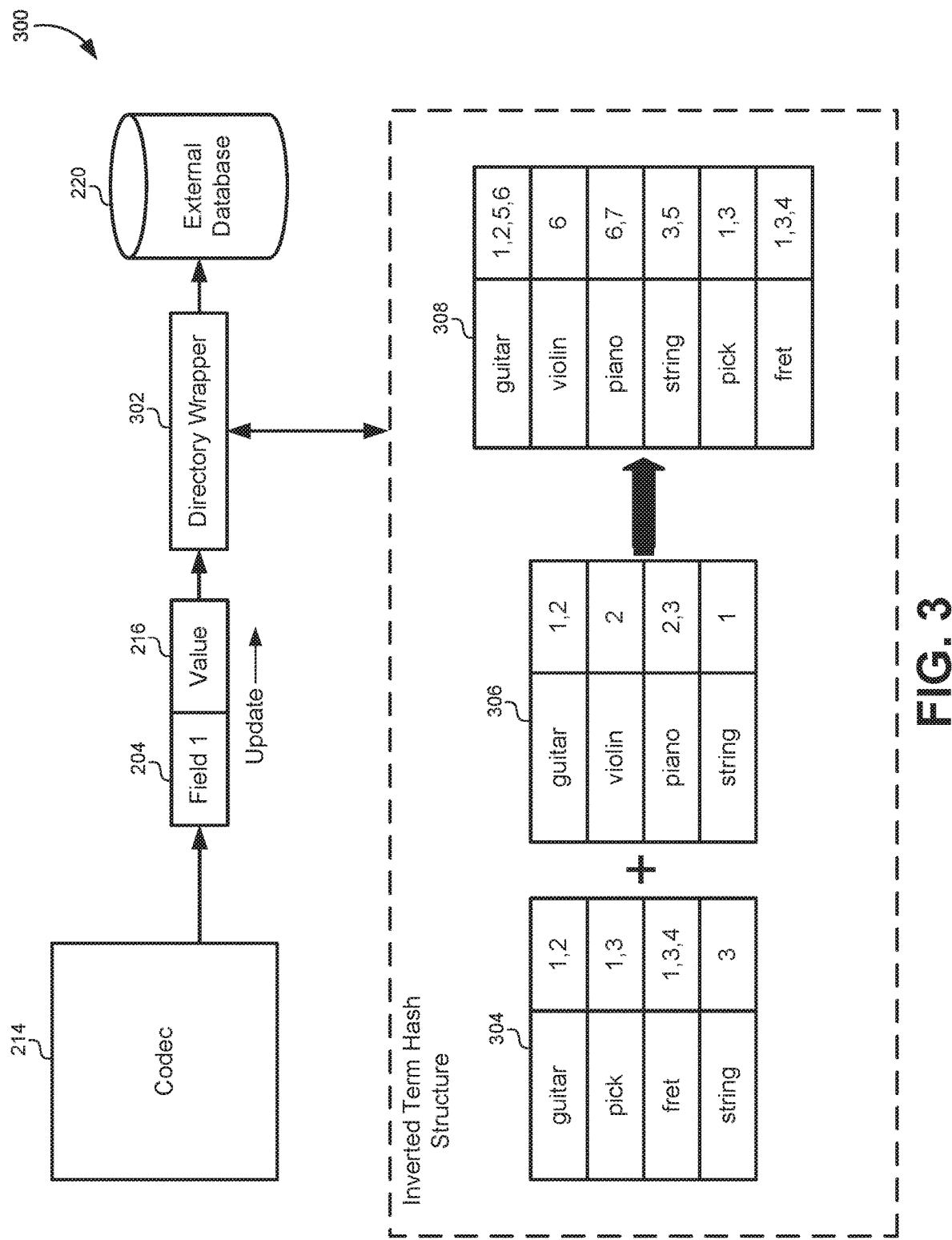
FIG. 3 illustrates how the a custom directory wrapper can be used to synchronize index representations between the internal index file and the external database, according to some embodiments.

FIG. 3 illustrates how the a custom directory wrapper 302 can be used to synchronize index representations between the internal index file and the external database 220, according to some embodiments. Immutable indexes, such as Lucene, generate new index segments 304, 306 for each document or batch of documents processed by the indexing application. Each segment 304, 306 includes its own document numbering system that is local to that segment itself. For example, segment 304 includes tokens from four different documents, the documents being numbered 1, 2, 3, and 4. The token "guitar" appears in document 1 and document 2, the token "pick" appears in document 1 and document 3, and so forth. In contrast, segment 306 includes tokens from three different documents than those of segment 304. However, because segment 306 is independent of section 304, the different documents are also labeled sequentially as document 1, document 2, document 3, and so forth, and thus may collide with the document numbering of segment 304.

Each segment 304, 306 is generated in RAM as the documents are indexed. If a search query is received, the indexing application will retrieve information from the in-memory RAM representations of segment 304 and segment 306. According to predefined criteria (a certain number of segments, a certain amount of memory used, a certain number of documents indexed, etc.) the segments 304, 306 will be periodically flushed and merged to the disk representation of the index file. When the segments are merged, the documents are renumbered in the combined segment. In the example of FIG. 3, documents 1, 2, and 3 of segment 306 have been renumbered as documents 5, 6, and 7 of the combined segment 308. Merge and/or flush operations also remove documents marked for deletion.

In order for the custom codec 214 to provide consistent results retrieved from both the internal index file and the external database 220, the custom codec 214 may need to mimic the segment representations and document numbering of the RAM and disk representations of the index file. In order to know when segments are flushed and documents are renumbered, some embodiments may implement a directory wrapper 302 around the file directory data structure of the indexing application. The directory wrapper 302 can provide indications to the custom codec 214 when flush/merge operations take place. Were this communication not to take place, there would be inconsistencies between the data in the internal index file and the data in the external database 220, as the merge method would write directly to the database 220 while the internal index file would not write the merged segment(s) to its file system. Turning back briefly to FIG. 2, the directory wrapper 302 encapsulates the memory map 224 and extends in front of the eternal database 220.

In one embodiment using the Lucene indexing application, the directory wrapper 302 captures any file syncing of the Lucene index and performs a syncing operation to the key-value store of the external database 220. The directory wrapper 302 is placed around Lucene's directory representation. Lucene interacts with the OS filesystem through the abstraction of the Directory Class, and with the custom directory wrapper 302 (referred to herein as the ExternalStoreDirectoryWrapper Class) it becomes possible to sync both the Lucene index files and the key-value data store storage files in the external database 220. The Sync( ) method of the Directory Class can be overridden such that when a merge happens, a new merged segment is flushed, the custom codec 214 is alerted. The FieldConsumer operation described above is invoked for flushing the merged segment, which will write a new RAM segment file with a custom extension. This file is written to inform the DirectoryWrapper that this particular segment has in-memory merge information and that while writing this RAM file to the external database 220, all the in-memory merge information should also be written to the external database 220. This will sync both the Lucene index files and the key-value store files for the external database 220.

Figure 4:
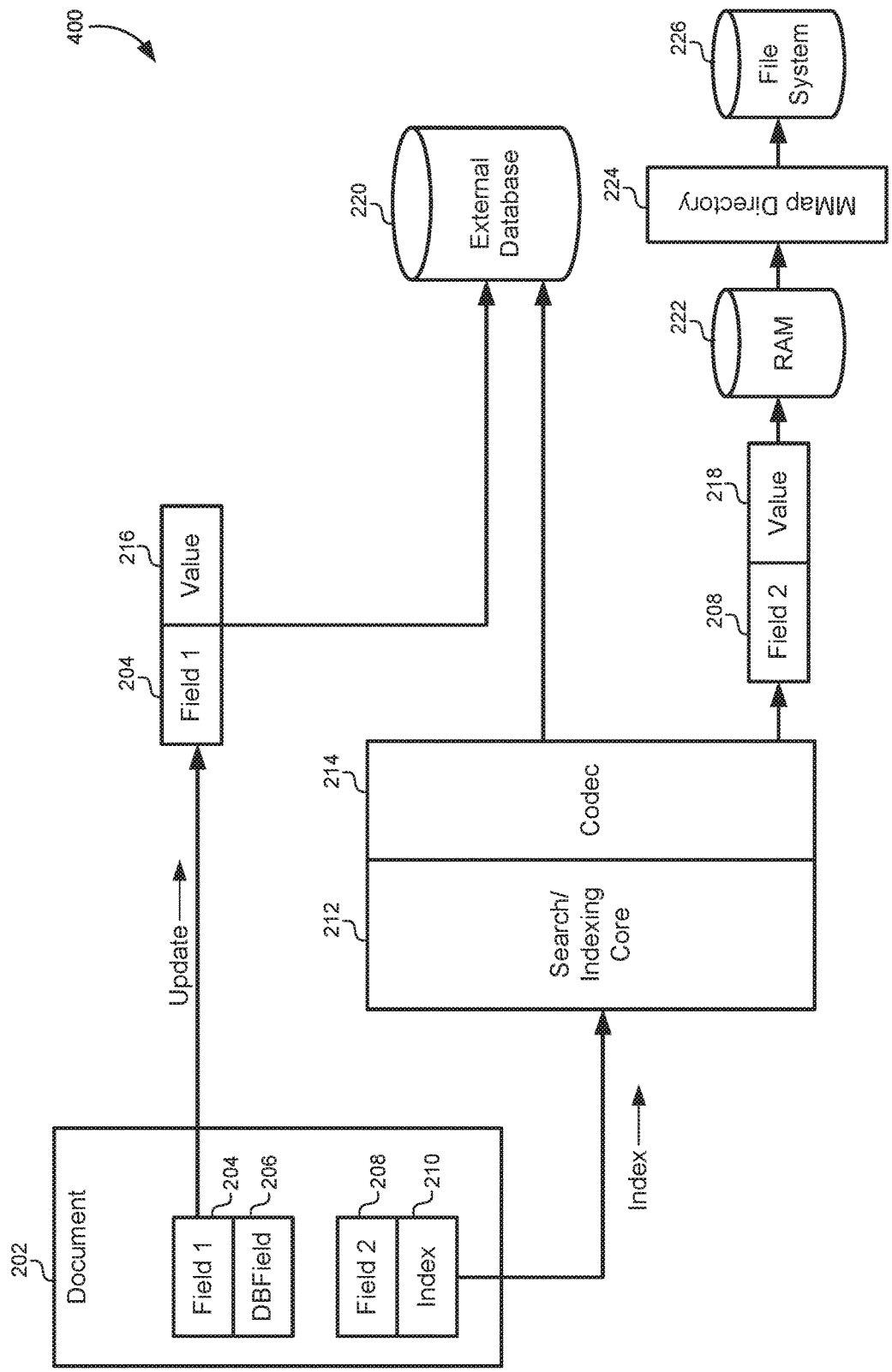
FIG. 4 illustrates how fields can be updated using the custom codec and external database, according to some embodiments.

FIG. 4 illustrates how fields can be updated using the custom codec 214 and the external database 220, according to some embodiments. Assuming the document 202 has already been indexed using the process described above in relation to FIG. 2, an updated operation can proceed as follows. For an updated operation, some fields in the document 202 may be changed, while other fields may remain static. For example, a new comment can be added to a conversation thread on a website. If a field 208 is changed that was not expected to change, then the schema will have given that field 208 a type 210 (represented by "Index") that is something other than the special DBField type. In this case, the document 202 will be reindexed by the search/indexing core 212, and all of the fields in the document 202 will be written to either the index file in RAM 222 of the indexing application or the external database 220, depending on the field type of each field in the document 202. If the schema and field types are set up correctly, this type of update operation should happen relatively infrequently.

On the other hand, when one or more fields 204 that are designated by the schema as likely to be updated are changed (e.g., have the DBField type), the fields 204 can be directly updated in the external database 220. In embodiments where the external database 220 is a key-value data store, the one or more fields 204 can be used to key the external database 220, and the one or more values 216 can be written to the external database 220 accordingly. Thus, when updates occur only in fields that the schema expects to be frequently updated (e.g., the DBField type), these fields can be updated directly in the external database 220 without reindexing the entire document 202.

Figure 5:
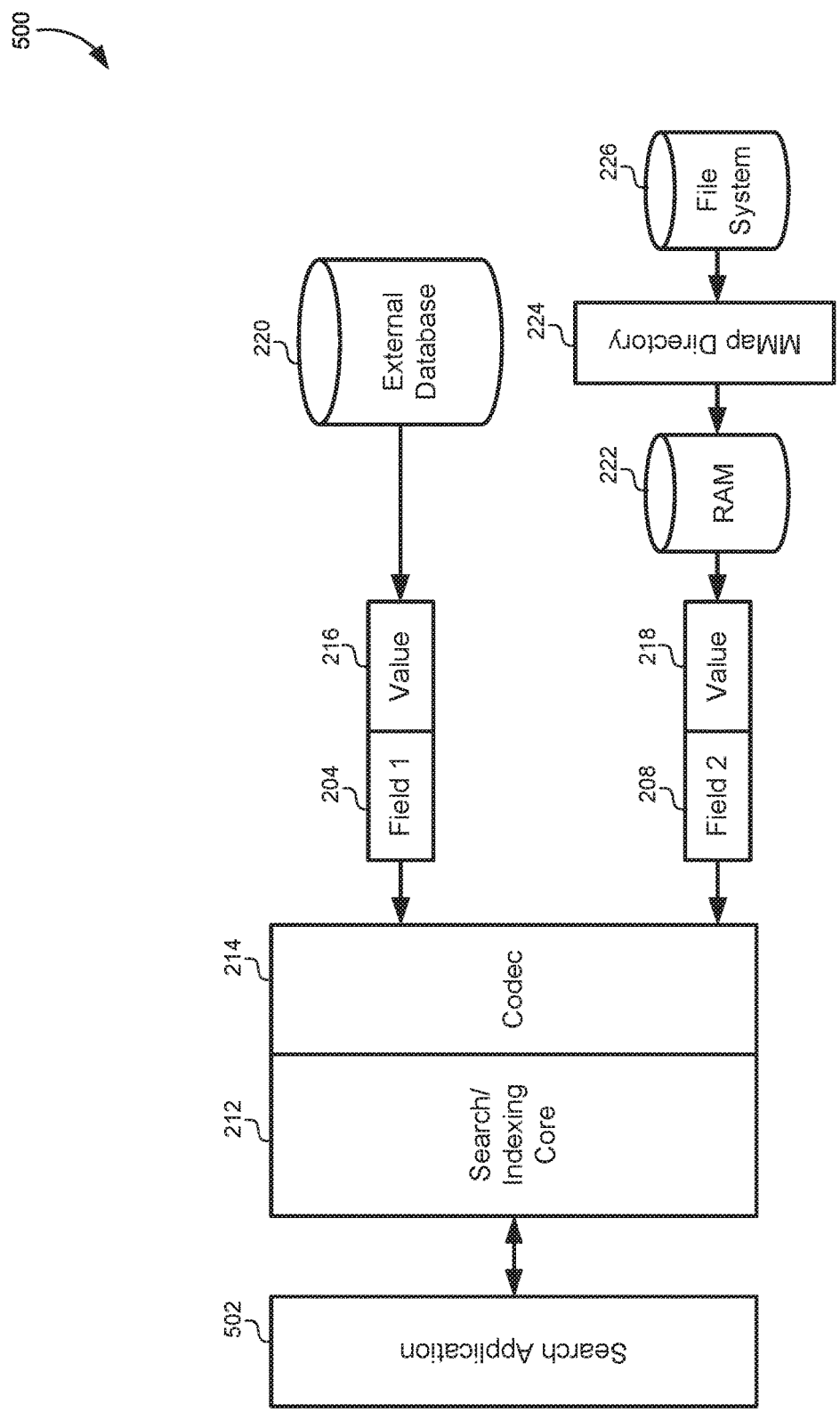
FIG. 5 illustrates how search application layer can retrieve results from both the external database and internal index layer, according to some embodiments.

FIG. 5 illustrates how a search application layer 502 can retrieve results from both the external database 220 and internal index file, according to some embodiments. When a search application layer 502, such as Solr™, receives a query from a user, the search/indexing core 212 of the indexing application can generate a list of tokens that are responsive to the query. The search/indexing core 212 can then pass the tokens to the custom codec 214, which can then query the internal index (222, 226) and the external database 220 using the tokens to locate the associated documents. The custom codec 214 can retrieve the document numbers for each token from either the internal index and the external database 220. The FieldProducer functions for each respective field type in the custom codec 214 can then generate fields that are passed back to the search/indexing core 212. These fields will include lists of document numbers responsive to the query. From the standpoint of the search/indexing core 212, the fields provided by the custom codec 214 will be indistinguishable as to whether they came from the index file or the external database 220.

Figure 6:
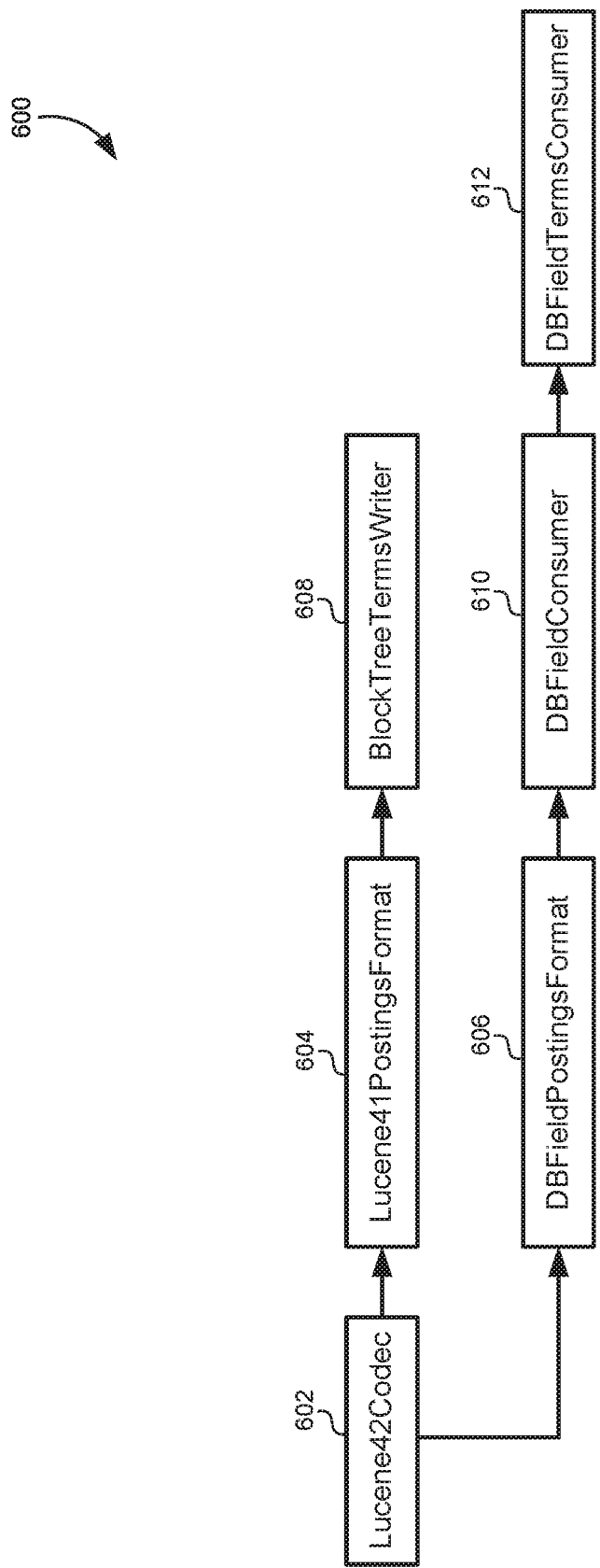
FIG. 6 illustrates a hierarchy of functions for processing frequently updated fields and less-frequently updated fields, according to some embodiments.

FIG. 6 illustrates a hierarchy of functions 600 for processing frequently updated fields and less-frequently updated fields, according to some embodiments. This hierarchy of functions can be used for particular embodiments using the Lucene indexing application. Lucene indexes a set of documents by first producing an inverted structure in memory. That is, Lucene takes all of the documents provided and produces hash terms for each using an indexing chain. When Lucene flushes the in-memory structures into a Lucene segment, Lucene uses the default Lucene42Codec 602 to get the field type associated with the field.

At this point, depending on the field type, the custom codec can select two different function paths for dealing with a particular field. For normal fields that are not designated as "DBFields," Lucene can use the default Lucene41PostingsFormat 604, which then uses the BlockTreeTermsWriter 608 function to write these fields to the Lucene internal index. On the other hand, when a field is designated as a "DBField," then a custom DBFieldPostingsFormat 606 function can be called, which will use a custom DBFieldConsumer 610 and a custom DBFieldTermsConsumer 612 to write the field to the external database.

Figure 7:
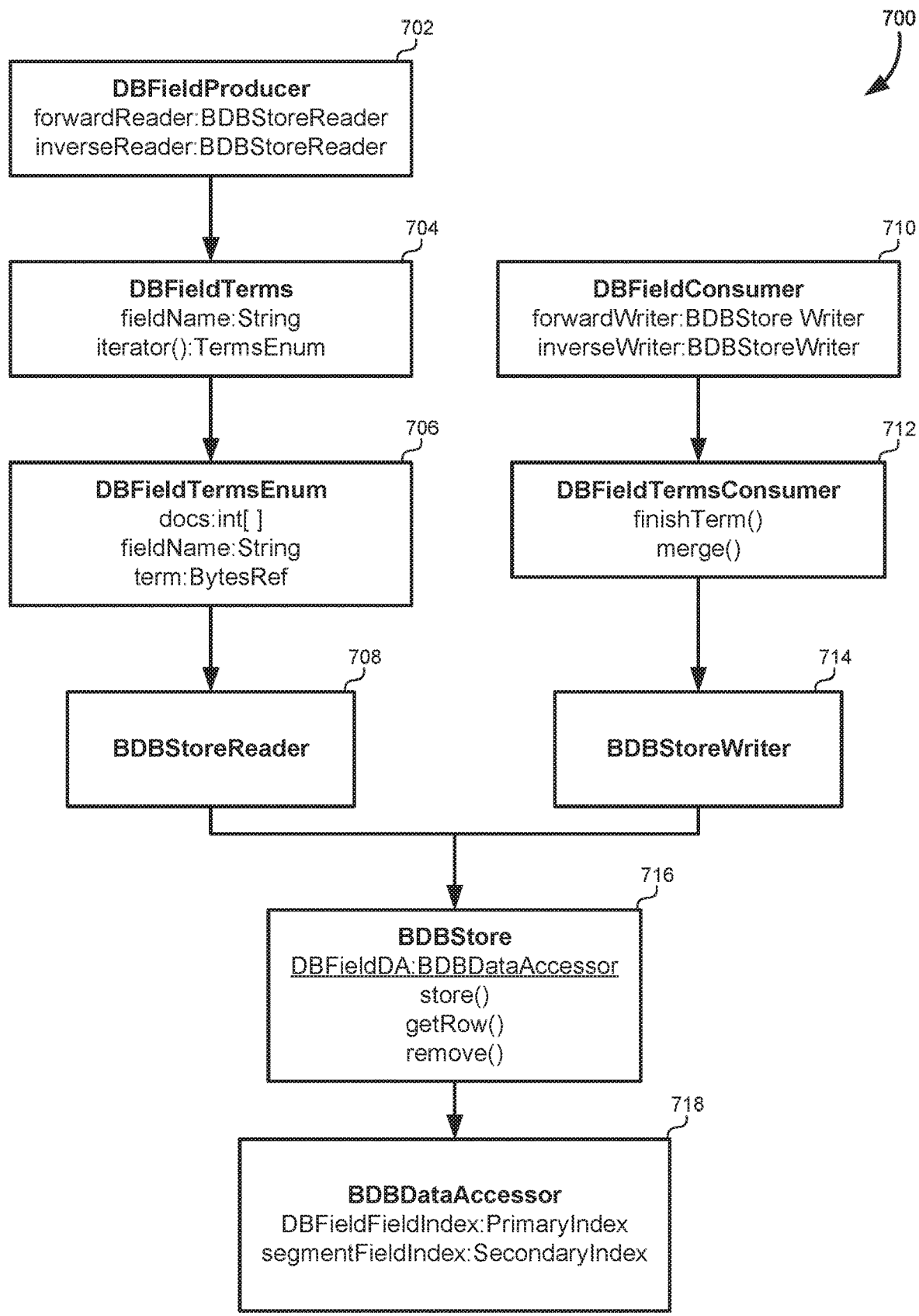
FIG. 7 illustrates a hierarchy of functions for reading and writing frequently updated fields to the external database in the custom codec, according to some embodiments.

FIG. 7 illustrates a hierarchy of functions for reading and writing frequently updated fields to the external database using the custom codec, according to some embodiments. Again, these particular functions are to be used with embodiments using the Lucene indexing application. The DBFieldProducer 702 and the DBFieldConsumer 710 functions override the standard FieldProducer and FieldConsumer functions of Lucene to specifically handle DBField types. The DBFieldTerms 704, DBFieldTermsEnum 706, and DBFieldTermsConsumer 712 parallel the equivalent functions in Lucene for non-DBField types, but specifically format these terms for writing to a key-value external database.

The BDBStoreReader 708 and the BDBStoreWriter 714 replace the BlockTreeReader and BlockTreeWriter functions in Lucene to facilitate writing a value into the Berkeley Database used with some embodiments. These functions interface with classes that wrap the Berkeley Database (BDBStore 716 and BDBDataAccessor 718) to store and retrieve rows from the Berkeley Database using the field as a primary index to the database.

Figure 8:
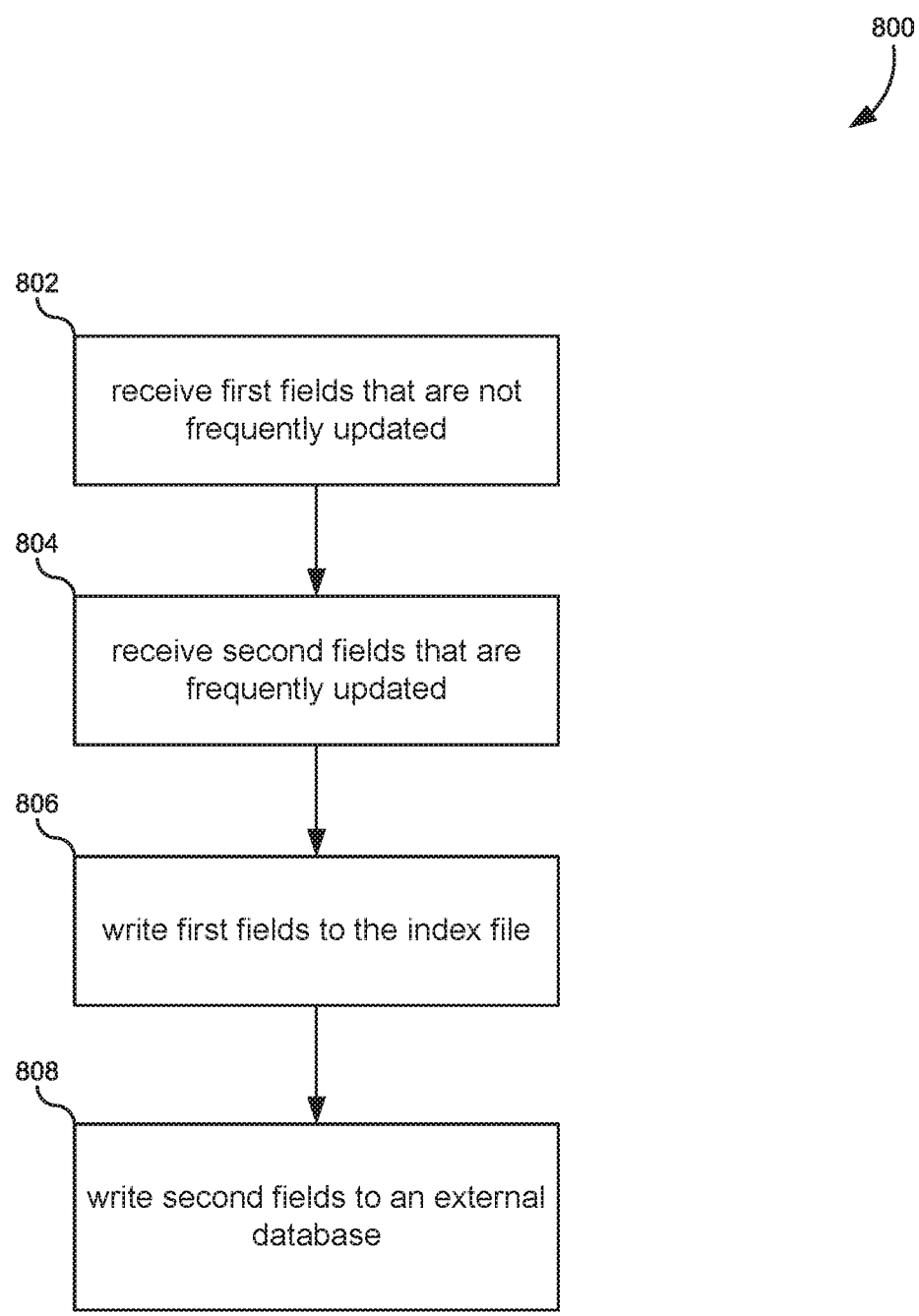
FIG. 8 illustrates a flowchart of a method for updating an immutable index using an external database, according to some embodiments.

FIG. 8 illustrates a flowchart 800 of a method for updating an immutable index using an external database, according to some embodiments. The method may include receiving first fields that are not frequently updated (802). These fields may be received from a document to be indexed, and may be designated as not expected to be frequently updated by their specific field types. The method may also include receiving second fields that are frequently updated (804). The second fields may also be received from the same document, or the same set of documents, as the first fields. The first and second fields may be received from an indexing application, such as Lucene. The second fields may be designated as such by virtue of their particular field type. The field type may be specified by a search layer schema. The method may additionally include writing the first fields to the index file of the indexing application (806) and writing the second fields to an external database (808). The index file of the indexing application may be immutable, such that it is not possible to update certain fields without reindexing the entire document and marking data related to the old version of the document for deletion.

Figure 9:
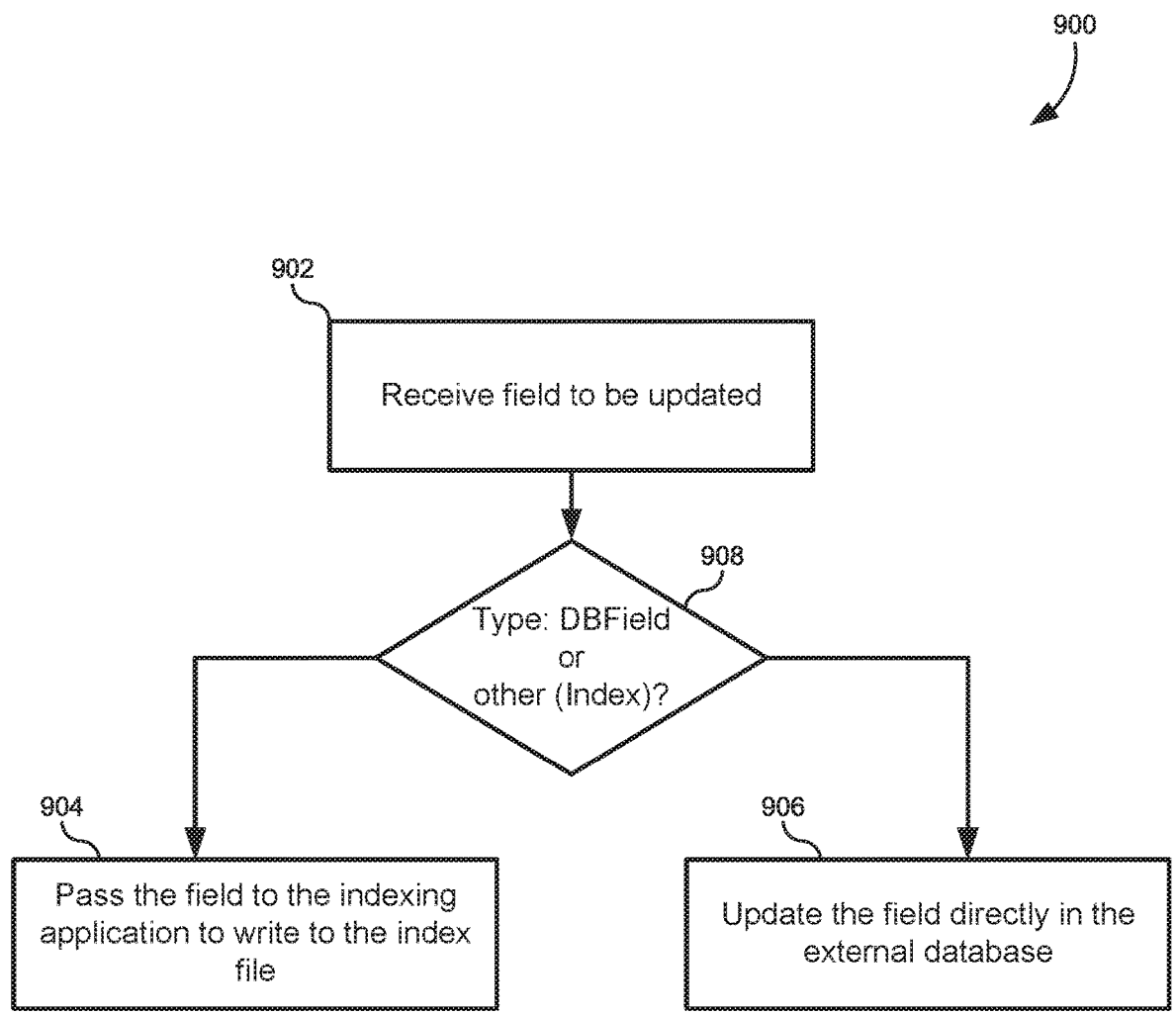
FIG. 9 illustrates a flowchart of a method for writing to the internal index file or the external database, according to some embodiments.

FIG. 9 illustrates a flowchart 900 of a method for writing to the internal index file or the external database, according to some embodiments. This update operation may be performed using a document that was previously indexed using the process of flowchart 800. The method may include receiving a field to be updated (902). A field type may be ascertained for the field (908). If the field type indicates that the field was previously stored in the external database (e.g., a DBField), then the field value can be updated directly in the external database without submitting the document to the indexing application for reindexing. Alternatively, if the field value indicates that the field was previously stored in the index file of the indexing application (e.g., a less-frequently updated field), then the method may include passing the field to the indexing application to write to the index file using the normal indexing path of the indexing application (904). This indexing path may include reindexing the entire document from which the field was extracted.

It should be appreciated that the specific steps illustrated in FIGS. 8-9 provide particular methods of generating and updating an index according to various embodiments of the present invention. Other sequences of steps may also be performed according to alternative embodiments. For example, alternative embodiments of the present invention may perform the steps outlined above in a different order. Moreover, the individual steps illustrated in FIGS. 8-9 may include multiple sub-steps that may be performed in various sequences as appropriate to the individual step. Furthermore, additional steps may be added or removed depending on the particular applications. One of ordinary skill in the art would recognize many variations, modifications, and alternatives.

Each of the methods described herein may be implemented by a computer system. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

Figure 10:
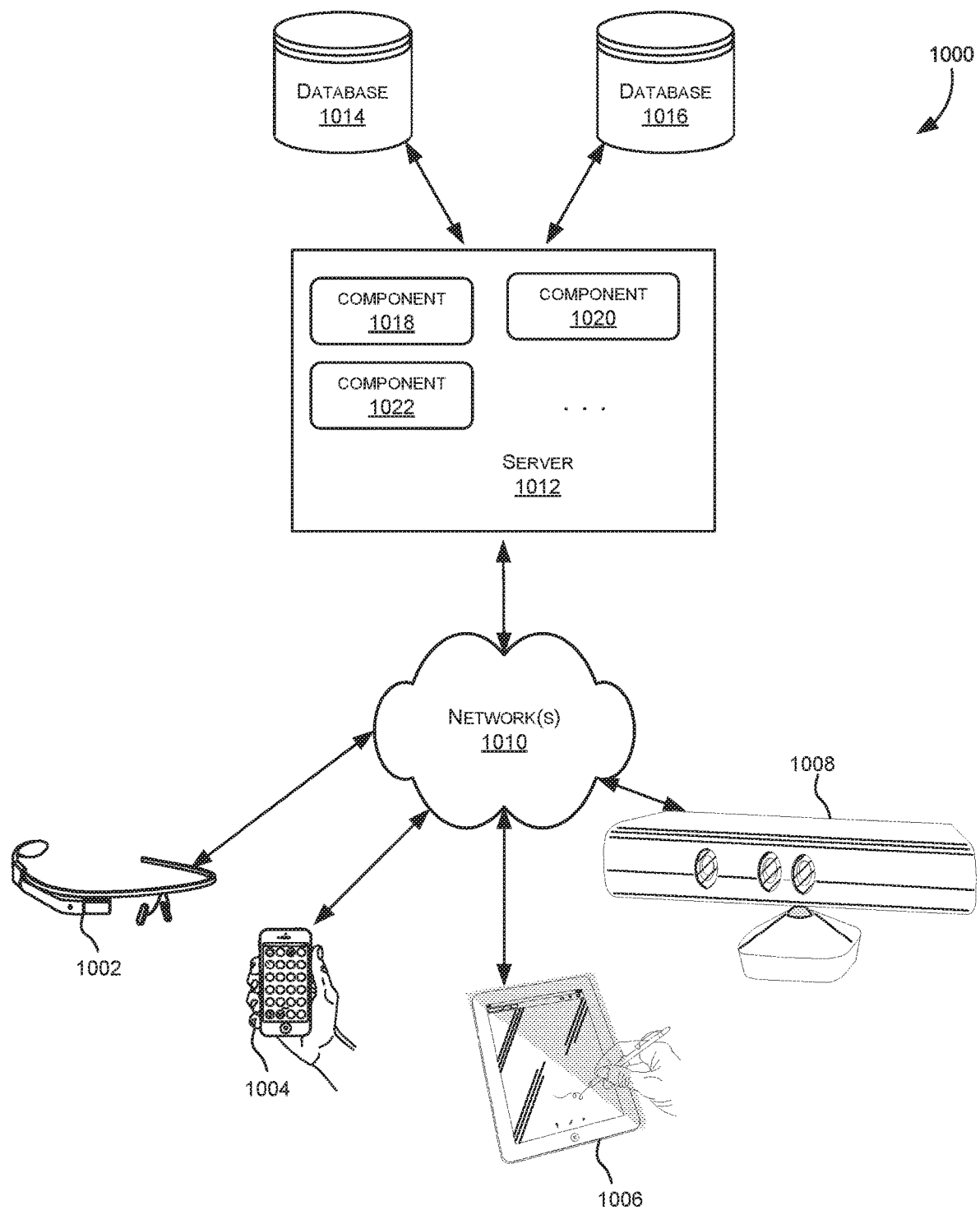
FIG. 10 illustrates a simplified block diagram of a distributed system for implementing some of the embodiments.

FIG. 10 depicts a simplified diagram of a distributed system 1000 for implementing one of the embodiments. In the illustrated embodiment, distributed system 1000 includes one or more client computing devices 1002, 1004, 1006, and 1008, which are configured to execute and operate a client application such as a web browser, proprietary client (e.g., Oracle Forms), or the like over one or more network(s) 1010. Server 1012 may be communicatively coupled with remote client computing devices 1002, 1004, 1006, and 1008 via network 1010.

In various embodiments, server 1012 may be adapted to run one or more services or software applications provided by one or more of the components of the system. In some embodiments, these services may be offered as web-based or cloud services or under a Software as a Service (SaaS) model to the users of client computing devices 1002, 1004, 1006, and/or 1008. Users operating client computing devices 1002, 1004, 1006, and/or 1008 may in turn utilize one or more client applications to interact with server 1012 to utilize the services provided by these components.

In the configuration depicted in the figure, the software components 1018, 1020 and 1022 of system 1000 are shown as being implemented on server 1012. In other embodiments, one or more of the components of system 1000 and/or the services provided by these components may also be implemented by one or more of the client computing devices 1002, 1004, 1006, and/or 1008. Users operating the client computing devices may then utilize one or more client applications to use the services provided by these components. These components may be implemented in hardware, firmware, software, or combinations thereof. It should be appreciated that various different system configurations are possible, which may be different from distributed system 1000. The embodiment shown in the figure is thus one example of a distributed system for implementing an embodiment system and is not intended to be limiting.

Client computing devices 1002, 1004, 1006, and/or 1008 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 1002, 1004, 1006, and 1008 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1010.

Although exemplary distributed system 1000 is shown with four client computing devices, any number of client computing devices may be supported. Other devices, such as devices with sensors, etc., may interact with server 1012.

Network(s) 1010 in distributed system 1000 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 1010 can be a local area network (LAN), such as one based on Ethernet, Token-Ring and/or the like. Network(s) 1010 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 1012 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 1012 may be adapted to run one or more services or software applications described in the foregoing disclosure. For example, server 1012 may correspond to a server for performing processing described above according to an embodiment of the present disclosure.

Server 1012 may run an operating system including any of those discussed above, as well as any commercially available server operating system. Server 1012 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1012 may include one or more applications to analyze and consolidate data feeds and/or event updates received from users of client computing devices 1002, 1004, 1006, and 1008. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1012 may also include one or more applications to display the data feeds and/or real-time events via one or more display devices of client computing devices 1002, 1004, 1006, and 1008.

Distributed system 1000 may also include one or more databases 1014 and 1016. Databases 1014 and 1016 may reside in a variety of locations. By way of example, one or more of databases 1014 and 1016 may reside on a non-transitory storage medium local to (and/or resident in) server 1012. Alternatively, databases 1014 and 1016 may be remote from server 1012 and in communication with server 1012 via a network-based or dedicated connection. In one set of embodiments, databases 1014 and 1016 may reside in a storage-area network (SAN). Similarly, any necessary files for performing the functions attributed to server 1012 may be stored locally on server 1012 and/or remotely, as appropriate. In one set of embodiments, databases 1014 and 1016 may include relational databases, such as databases provided by Oracle, that are adapted to store, update, and retrieve data in response to SQL-formatted commands.

Figure 11:
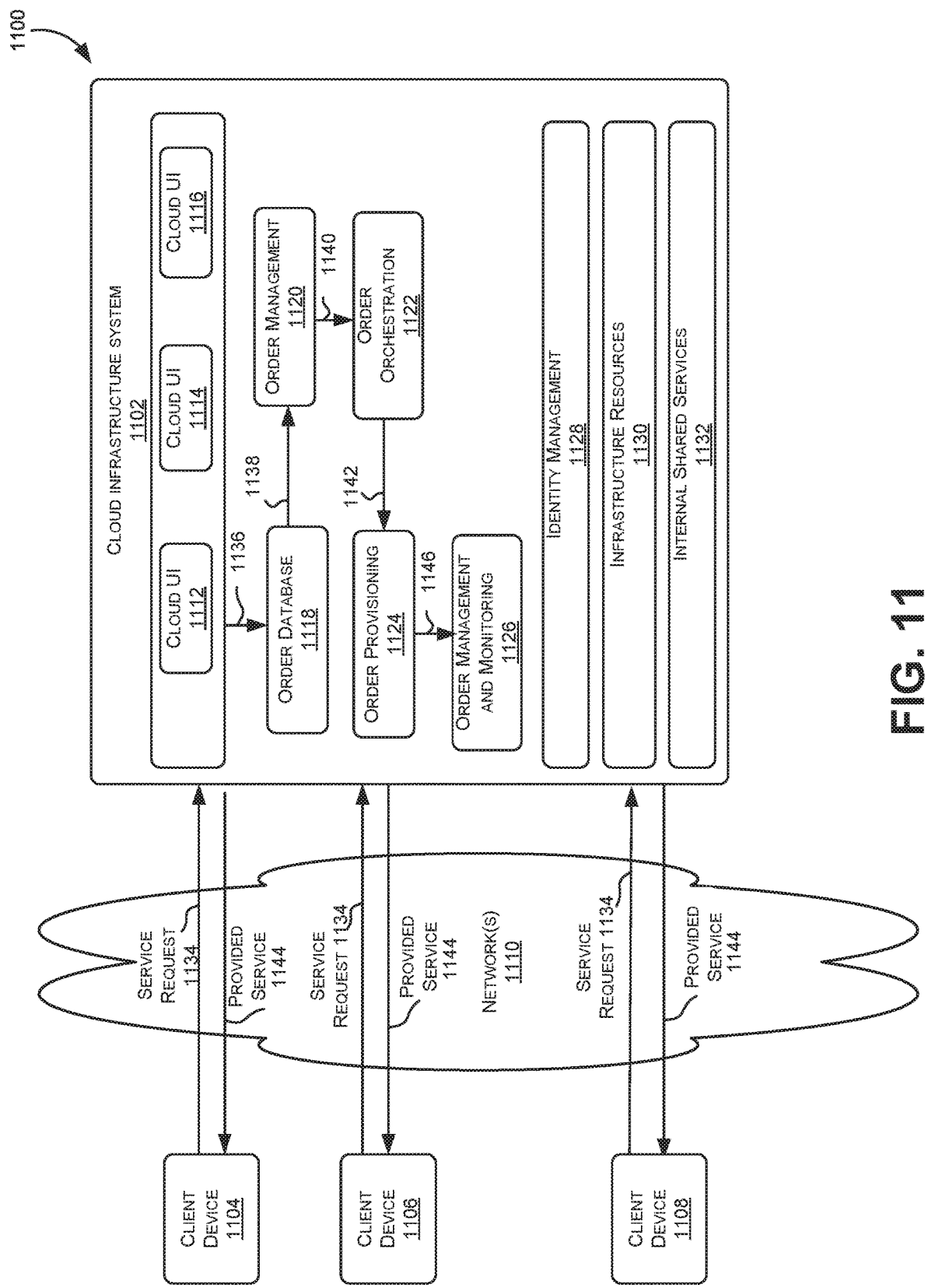
FIG. 11 illustrates a simplified block diagram of components of a system environment by which services provided by the components of an embodiment system may be offered as cloud services.

FIG. 11 is a simplified block diagram of one or more components of a system environment 1100 by which services provided by one or more components of an embodiment system may be offered as cloud services, in accordance with an embodiment of the present disclosure. In the illustrated embodiment, system environment 1100 includes one or more client computing devices 1104, 1106, and 1108 that may be used by users to interact with a cloud infrastructure system 1102 that provides cloud services. The client computing devices may be configured to operate a client application such as a web browser, a proprietary client application (e.g., Oracle Forms), or some other application, which may be used by a user of the client computing device to interact with cloud infrastructure system 1102 to use services provided by cloud infrastructure system 1102.

It should be appreciated that cloud infrastructure system 1102 depicted in the figure may have other components than those depicted. Further, the embodiment shown in the figure is only one example of a cloud infrastructure system that may incorporate an embodiment of the invention. In some other embodiments, cloud infrastructure system 1102 may have more or fewer components than shown in the figure, may combine two or more components, or may have a different configuration or arrangement of components.

Client computing devices 1104, 1106, and 1108 may be devices similar to those described above for 1002, 1004, 1006, and 1008.

Although exemplary system environment 1100 is shown with three client computing devices, any number of client computing devices may be supported. Other devices such as devices with sensors, etc. may interact with cloud infrastructure system 1102.

Network(s) 1110 may facilitate communications and exchange of data between clients 1104, 1106, and 1108 and cloud infrastructure system 1102. Each network may be any type of network familiar to those skilled in the art that can support data communications using any of a variety of commercially-available protocols, including those described above for network(s) 1010.

Cloud infrastructure system 1102 may comprise one or more computers and/or servers that may include those described above for server 1012.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1102 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1102 may be adapted to automatically provision, manage and track a customer's subscription to services offered by cloud infrastructure system 1102. Cloud infrastructure system 1102 may provide the cloud services via different deployment models. For example, services may be provided under a public cloud model in which cloud infrastructure system 1102 is owned by an organization selling cloud services (e.g., owned by Oracle) and the services are made available to the general public or different industry enterprises. As another example, services may be provided under a private cloud model in which cloud infrastructure system 1102 is operated solely for a single organization and may provide services for one or more entities within the organization. The cloud services may also be provided under a community cloud model in which cloud infrastructure system 1102 and the services provided by cloud infrastructure system 1102 are shared by several organizations in a related community. The cloud services may also be provided under a hybrid cloud model, which is a combination of two or more different models.

In some embodiments, the services provided by cloud infrastructure system 1102 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1102. Cloud infrastructure system 1102 then performs processing to provide the services in the customer's subscription order.

In some embodiments, the services provided by cloud infrastructure system 1102 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1102 may also include infrastructure resources 1130 for providing the resources used to provide various services to customers of the cloud infrastructure system. In one embodiment, infrastructure resources 1130 may include pre-integrated and optimized combinations of hardware, such as servers, storage, and networking resources to execute the services provided by the PaaS platform and the SaaS platform.

In some embodiments, resources in cloud infrastructure system 1102 may be shared by multiple users and dynamically re-allocated per demand. Additionally, resources may be allocated to users in different time zones. For example, cloud infrastructure system 1130 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1132 may be provided that are shared by different components or modules of cloud infrastructure system 1102 and by the services provided by cloud infrastructure system 1102. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1102 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1102, and the like.

In one embodiment, as depicted in the figure, cloud management functionality may be provided by one or more modules, such as an order management module 1120, an order orchestration module 1122, an order provisioning module 1124, an order management and monitoring module 1126, and an identity management module 1128. These modules may include or be provided using one or more computers and/or servers, which may be general purpose computers, specialized server computers, server farms, server clusters, or any other appropriate arrangement and/or combination.

In exemplary operation 1134, a customer using a client device, such as client device 1104, 1106 or 1108, may interact with cloud infrastructure system 1102 by requesting one or more services provided by cloud infrastructure system 1102 and placing an order for a subscription for one or more services offered by cloud infrastructure system 1102. In certain embodiments, the customer may access a cloud User Interface (UI), cloud UI 1112, cloud UI 1114 and/or cloud UI 1116 and place a subscription order via these UIs. The order information received by cloud infrastructure system 1102 in response to the customer placing an order may include information identifying the customer and one or more services offered by the cloud infrastructure system 1102 that the customer intends to subscribe to.

After an order has been placed by the customer, the order information is received via the cloud UIs, 1112, 1114 and/or 1116.

At operation 1136, the order is stored in order database 1118. Order database 1118 can be one of several databases operated by cloud infrastructure system 1118 and operated in conjunction with other system elements.

At operation 1138, the order information is forwarded to an order management module 1120. In some instances, order management module 1120 may be configured to perform billing and accounting functions related to the order, such as verifying the order, and upon verification, booking the order.

At operation 1140, information regarding the order is communicated to an order orchestration module 1122. Order orchestration module 1122 may utilize the order information to orchestrate the provisioning of services and resources for the order placed by the customer. In some instances, order orchestration module 1122 may orchestrate the provisioning of resources to support the subscribed services using the services of order provisioning module 1124.

In certain embodiments, order orchestration module 1122 enables the management of business processes associated with each order and applies business logic to determine whether an order should proceed to provisioning. At operation 1142, upon receiving an order for a new subscription, order orchestration module 1122 sends a request to order provisioning module 1124 to allocate resources and configure those resources needed to fulfill the subscription order. Order provisioning module 1124 enables the allocation of resources for the services ordered by the customer. Order provisioning module 1124 provides a level of abstraction between the cloud services provided by cloud infrastructure system 1100 and the physical implementation layer that is used to provision the resources for providing the requested services. Order orchestration module 1122 may thus be isolated from implementation details, such as whether or not services and resources are actually provisioned on the fly or pre-provisioned and only allocated/assigned upon request.

At operation 1144, once the services and resources are provisioned, a notification of the provided service may be sent to customers on client devices 1104, 1106 and/or 1108 by order provisioning module 1124 of cloud infrastructure system 1102.

At operation 1146, the customer's subscription order may be managed and tracked by an order management and monitoring module 1126. In some instances, order management and monitoring module 1126 may be configured to collect usage statistics for the services in the subscription order, such as the amount of storage used, the amount data transferred, the number of users, and the amount of system up time and system down time.

In certain embodiments, cloud infrastructure system 1100 may include an identity management module 1128. Identity management module 1128 may be configured to provide identity services, such as access management and authorization services in cloud infrastructure system 1100. In some embodiments, identity management module 1128 may control information about customers who wish to utilize the services provided by cloud infrastructure system 1102. Such information can include information that authenticates the identities of such customers and information that describes which actions those customers are authorized to perform relative to various system resources (e.g., files, directories, applications, communication ports, memory segments, etc.) Identity management module 1128 may also include the management of descriptive information about each customer and about how and by whom that descriptive information can be accessed and modified.

Figure 12:
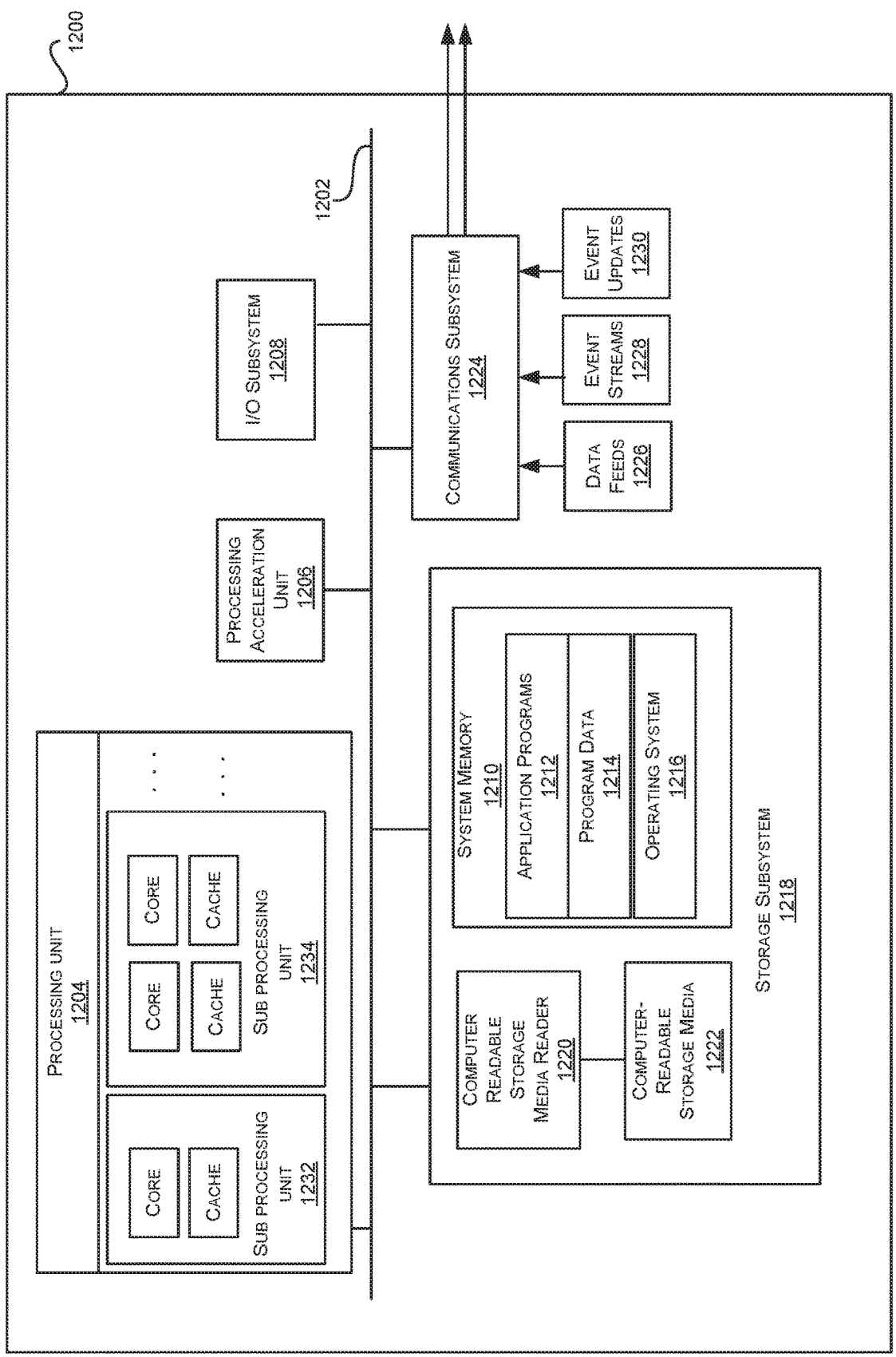
FIG. 12 illustrates an exemplary computer system, in which various embodiments may be implemented.

FIG. 12 illustrates an exemplary computer system 1200, in which various embodiments of the present invention may be implemented. The system 1200 may be used to implement any of the computer systems described above. As shown in the figure, computer system 1200 includes a processing unit 1204 that communicates with a number of peripheral subsystems via a bus subsystem 1202. These peripheral subsystems may include a processing acceleration unit 1206, an I/O subsystem 1208, a storage subsystem 1218 and a communications subsystem 1224. Storage subsystem 1218 includes tangible computer-readable storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1204, which can be implemented as one or more integrated circuits (e.g., a conventional microprocessor or microcontroller), controls the operation of computer system 1200. One or more processors may be included in processing unit 1204. These processors may include single core or multicore processors. In certain embodiments, processing unit 1204 may be implemented as one or more independent processing units 1232 and/or 1234 with single or multicore processors included in each processing unit. In other embodiments, processing unit 1204 may also be implemented as a quad-core processing unit formed by integrating two dual-core processors into a single chip.

In various embodiments, processing unit 1204 can execute a variety of programs in response to program code and can maintain multiple concurrently executing programs or processes. At any given time, some or all of the program code to be executed can be resident in processor(s) 1204 and/or in storage subsystem 1218. Through suitable programming, processor(s) 1204 can provide various functionalities described above. Computer system 1200 may additionally include a processing acceleration unit 1206, which can include a digital signal processor (DSP), a special-purpose processor, and/or the like.

I/O subsystem 1208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1200 may comprise a storage subsystem 1218 that comprises software elements, shown as being currently located within a system memory 1210. System memory 1210 may store program instructions that are loadable and executable on processing unit 1204, as well as data generated during the execution of these programs.

Depending on the configuration and type of computer system 1200, system memory 1210 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1204. In some implementations, system memory 1210 may include multiple different types of memory, such as static random access memory (SRAM) or dynamic random access memory (DRAM). In some implementations, a basic input/output system (BIOS), containing the basic routines that help to transfer information between elements within computer system 1200, such as during start-up, may typically be stored in the ROM. By way of example, and not limitation, system memory 1210 also illustrates application programs 1212, which may include client applications, Web browsers, mid-tier applications, relational database management systems (RDBMS), etc., program data 1214, and an operating system 1216. By way of example, operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1218 may also provide a tangible computer-readable storage medium for storing the basic programming and data constructs that provide the functionality of some embodiments. Software (programs, code modules, instructions) that when executed by a processor provide the functionality described above may be stored in storage subsystem 1218. These software modules or instructions may be executed by processing unit 1204. Storage subsystem 1218 may also provide a repository for storing data used in accordance with the present invention.

Storage subsystem 1200 may also include a computer-readable storage media reader 1220 that can further be connected to computer-readable storage media 1222. Together and, optionally, in combination with system memory 1210, computer-readable storage media 1222 may comprehensively represent remote, local, fixed, and/or removable storage devices plus storage media for temporarily and/or more permanently containing, storing, transmitting, and retrieving computer-readable information.

Computer-readable storage media 1222 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1200.

By way of example, computer-readable storage media 1222 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1200.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to connect to one or more devices via the Internet. In some embodiments communications subsystem 1224 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1224 can provide wired network connectivity (e.g., Ethernet) in addition to or instead of a wireless interface.

In some embodiments, communications subsystem 1224 may also receive input communication in the form of structured and/or unstructured data feeds 1226, event streams 1228, event updates 1230, and the like on behalf of one or more users who may use computer system 1200.

By way of example, communications subsystem 1224 may be configured to receive data feeds 1226 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1224 may also be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1224 may also be configured to output the structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1200 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing description, for the purposes of explanation, numerous specific details were set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the foregoing description to provide a thorough understanding of the embodiments. However, it will be understood by one of ordinary skill in the art that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method of indexing documents to support frequent field updates without reindexing, the method comprising:
receiving, from an indexing application, first fields from a document to be indexed, wherein the first fields are indicated to be less frequently updated;
receiving, from the indexing application, second fields from the document to be indexed, wherein the second fields are indicated to be more frequently updated;
writing the first fields to an immutable index file associated with the indexing application;
writing the second fields to an external database that is separate from the index file of the indexing application;
determining whether a field to be updated is one of the second fields or one of the first fields, and
(i) where the field to be updated is one of the second fields, updating the field directly in the external data store without reindexing the document with the indexing application, and
(ii) where the field to be updated is one of the first fields, passing the field to the indexing application to cause reindexing of the document in a new index segment of the index file:
receiving an indication that the new index segment is being merged with another index segment; and
renumbering document identifiers in the external database to parallel document identifier renumbering in the merged index segments, wherein document identifier numbering is consistent across the index file and external database.

2. The method of claim 1 wherein the first fields are associated with a first field type that indicates that the first fields are less likely to be frequently updated.

3. The method of claim 1 wherein the second fields are associated with a second field type that indicates that the second fields are more likely to be frequently updated.

4. The method of claim 1 wherein the external database comprises a key-value data store.

5. A non-transitory, computer-readable medium comprising instructions which, when executed by one or more processors, causes the one or more processors to perform operations comprising:
receiving, from an indexing application, first fields from a document to be indexed, wherein the first fields are indicated to be less frequently updated;
receiving, from the indexing application, second fields from the document to be indexed, wherein the second fields are indicated to be more frequently updated;
writing the first fields to an immutable index file associated with the indexing application;
writing the second fields to an external database that is separate from the index file of the indexing application;
determining whether a field to be updated is one of the second fields or one of the first fields, and
(i) where the field to be updated is one of the second fields, updating the field directly in the external data store without reindexing the document with the indexing application, and
(ii) where the field to be updated is one of the first fields, passing the field to the indexing application to cause reindexing of the document in a new index segment of the index file:
receiving indication that the new index segment is being merged with another index segment; and
renumbering document identifiers in the external database to parallel document identifier renumbering in the merged index segments, wherein document identifier numbering is consistent across the index file and external database.

6. The non-transitory computer-readable memory according to claim 5 wherein the first fields are associated with a first field type that indicates that the first fields are less likely to be frequently updated.

7. The non-transitory computer-readable memory according to claim 5 wherein the second fields are associated with a second field type that indicates that the second fields are more likely to be frequently updated.

8. The non-transitory computer-readable memory according to claim 5 wherein the external database comprises a key-value data store.

9. A system comprising:
one or more processors; and
receiving, from an indexing application, first fields from a document to be indexed, wherein the first fields are indicated to be less frequently updated;
receiving, from the indexing application, second fields from the document to be indexed, wherein the second fields are indicated to be more frequently updated;
writing the first fields to an immutable index file associated with the indexing application;
writing the second fields to an external database that is separate from the index file of the indexing application;
determining whether a field to be updated is one of the second fields or one of the first fields, and
(i) where the field to be updated is one of the second fields, updating the field directly in the external data store without reindexing the document with the indexing application, and
(ii) where the field to be updated is one of the first fields, passing the field to the indexing application to cause reindexing of the document in a new index segment of the index file:
receiving indication that the new index segment is being merged with another index segment; and
renumbering document identifiers in the external database to parallel document identifier renumbering in the merged index segments, wherein document identifier numbering is consistent across the index file and external database.

10. The system of claim 9 wherein the first fields are associated with a first field type that indicates that the first fields are less likely to be frequently updated.

11. The system of claim 9 wherein the second fields are associated with a second field type that indicates that the second fields are more likely to be frequently updated.

12. The system of claim 9 wherein the external database comprises a key-value data store.

13. The method of claim 1, further comprising:
extracting a first field type from each of the first fields;
determining that the first field type indicates that the first fields are less frequently updated;
extracting a second field type from each of the second fields; and
determining that the second field type indicates that the second fields are more frequently updated.

14. The non-transitory computer-readable memory according to claim 5, wherein the instructions further comprise instructions that, when executed cause the one or more processors to perform further operations comprising:
extracting a first field type from each of the first fields;
determining that the first field type indicates that the first fields are less frequently updated;
extracting a second field type from each of the second fields; and
determining that the second field type indicates that the second fields are more frequently updated.

15. The system of claim 9, wherein the operations performed by the one or more processors further comprise:
extracting a first field type from each of the first fields;
determining that the first field type indicates that the first fields are less frequently updated;
extracting a second field type from each of the second fields; and
determining that the second field type indicates that the second fields are more frequently updated.

16. The method of claim 1, further comprising:
wrapping at least a portion of a file system that includes the index file with a directory wrapper; and
capturing an update to the index file with the directory wrapper.

17. The non-transitory computer-readable memory according to claim 5, wherein the instructions further comprise instructions that, when executed cause the one or more processors to perform further operations comprising:
wrapping at least a portion of a file system that includes the index file with a directory wrapper; and
capturing an update to the index file with the directory wrapper.

18. The system of claim 9, wherein the operations performed by the one or more processors further comprise:
wrapping at least a portion of a file system that includes the index file with a directory wrapper; and
capturing an update to the index file with the directory wrapper.

* * * * *

UNITED STATES PATENT AND TRADEMARK OFFICE
CERTIFICATE OF CORRECTION

PATENT NO. : 11,334,638 B2
APPLICATION NO. : 16/406054
DATED : May 17, 2022
INVENTOR(S) : Tripathi et al.

It is certified that error appears in the above-identified patent and that said Letters Patent is hereby corrected as shown below:

On the Title Page

Column 1, under Item (72) Inventors, Line 5, delete "Hyderbad" and insert -- Hyderabad --, therefor.

In the Specification

In Column 2, Line 44, delete "the a" and insert -- a --, therefor.

In Column 6, Line 27, delete "the a" and insert -- a --, therefor.

In Column 19, Line 50, delete "(e.g.," and insert -- e.g., --, therefor.

In the Claims

In Column 23, Line 1, in Claim 6, delete "memory" and insert -- medium --, therefor.

In Column 23, Line 5, in Claim 7, delete "memory" and insert -- medium --, therefor.

In Column 23, Line 9, in Claim 8, delete "memory" and insert -- medium --, therefor.

In Column 24, Line 9, in Claim 14, delete "memory" and insert -- medium --, therefor.

In Column 24, Line 34, in Claim 17, delete "memory" and insert -- medium --, therefor.

Signed and Sealed this
Fifteenth Day of November, 2022

Katherine Kelly Vidal
*Director of the United States Patent and Trademark Office*